United States Patent

Boehm et al.

[11] Patent Number: 5,970,858
[45] Date of Patent: Oct. 26, 1999

[54] TABLE TOP GRILL

[75] Inventors: Michael W. Boehm, Batavia; Robert W. Johnson, Naperville, both of Ill.

[73] Assignee: Tsann Kuen USA, Inc., Pasadena, Calif.

[21] Appl. No.: 09/058,522

[22] Filed: Apr. 10, 1998

[51] Int. Cl.[6] .............................. A47J 37/00; A47J 37/06
[52] U.S. Cl. ................................ 99/446; 99/400; 99/419; 99/444; 99/448
[58] Field of Search ............................. 99/400, 444, 446, 99/447, 448, 339, 345, 347, 349, 419

[56] References Cited

U.S. PATENT DOCUMENTS

| | | | |
|---|---|---|---|
| 472,537 | 4/1892 | Griswold et al. | 99/446 |
| 3,038,402 | 6/1962 | Singer | 99/419 |
| 3,078,783 | 2/1963 | Lee, Sr. . | |
| 3,301,172 | 1/1967 | Haro | 99/446 |
| 4,140,889 | 2/1979 | Mason, Jr. et al. | 99/444 |
| 4,198,561 | 4/1980 | Fujioka | 99/444 |
| 4,554,864 | 11/1985 | Smith et al. . | |
| 4,768,427 | 9/1988 | Cheng . | |
| 4,924,071 | 5/1990 | Jacobs . | |
| 5,070,777 | 12/1991 | Novak . | |
| 5,121,676 | 6/1992 | Jurgens . | |
| 5,129,312 | 7/1992 | Berger . | |
| 5,176,067 | 1/1993 | Higgins . | |
| 5,191,831 | 3/1993 | Walden . | |
| 5,320,028 | 6/1994 | Grunberg . | |
| 5,582,094 | 12/1996 | Peterson et al. . | |
| 5,584,235 | 12/1996 | DuBois et al. . | |
| 5,584,236 | 12/1996 | Margolis . | |
| 5,606,905 | 3/1997 | Boehm et al. . | |

OTHER PUBLICATIONS

Tsann Kuen Group '98–'99 Catalog; published by Tsann Kuen Enterprise Co., Ltd.; p. 17 through p. 21.

*Primary Examiner*—David Lacey
*Assistant Examiner*—Hao Mai
*Attorney, Agent, or Firm*—Loyal McKinley Hanson

[57] ABSTRACT

An appliance for cooking foodstuffs includes an electric grill plate adapted for use atop a horizontal table top surface, a plate component of the electric grill plate, and a frustum-shaped cooking surface on the plate component that slopes downwardly in all horizontal directions from a central vertical axis in order to promote drainage from foodstuffs during cooking. One embodiment also includes concentric ribs for holding the foodstuffs from sliding downwardly across the cooking surface, a two-position marinade cup mounted in a central chimney for containing marinade in a selected one of high-heat and low-heat proximity to the cooking surface of the plate component, a scalloped cup lip for receiving skewers, a perimeter fence for retaining the foodstuffs on the cooking surface, indentations along the fence for receiving the skewers and providing a flow path for steam to pass out from under the cover, a see-through glass cover, a removable grease tray, a cool-to-touch base, and a submersible electric grill plate.

1 Claim, 2 Drawing Sheets

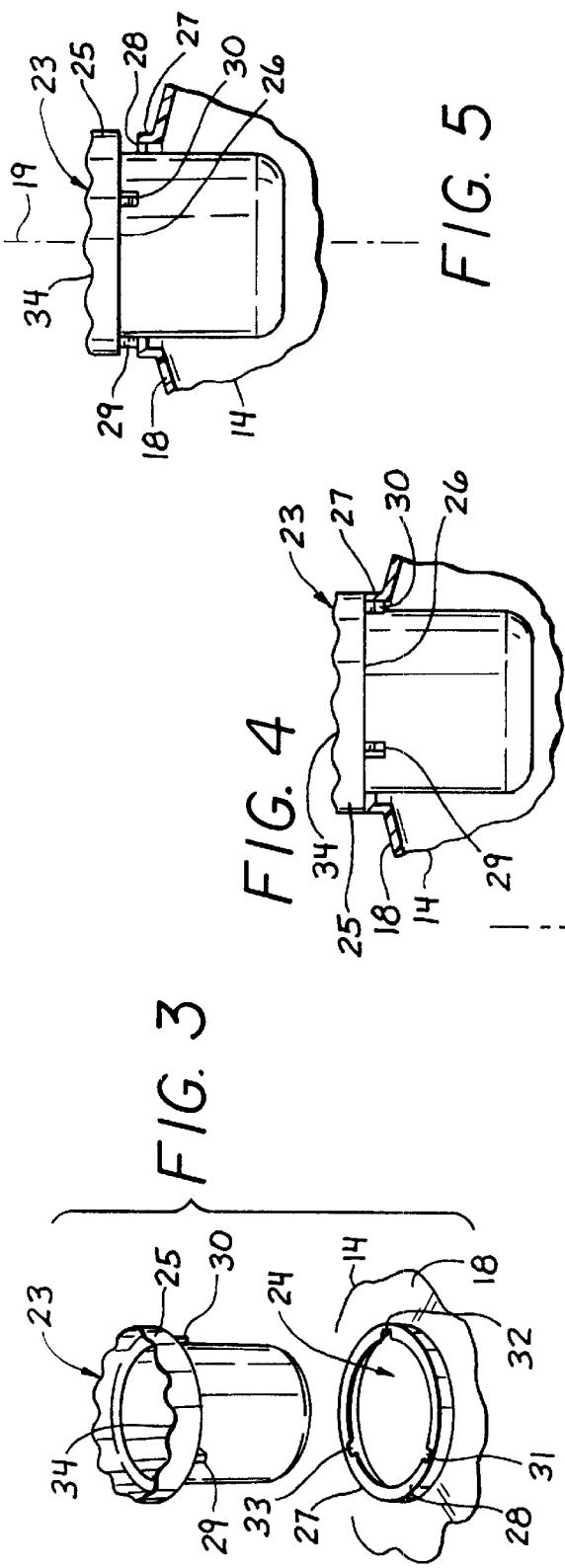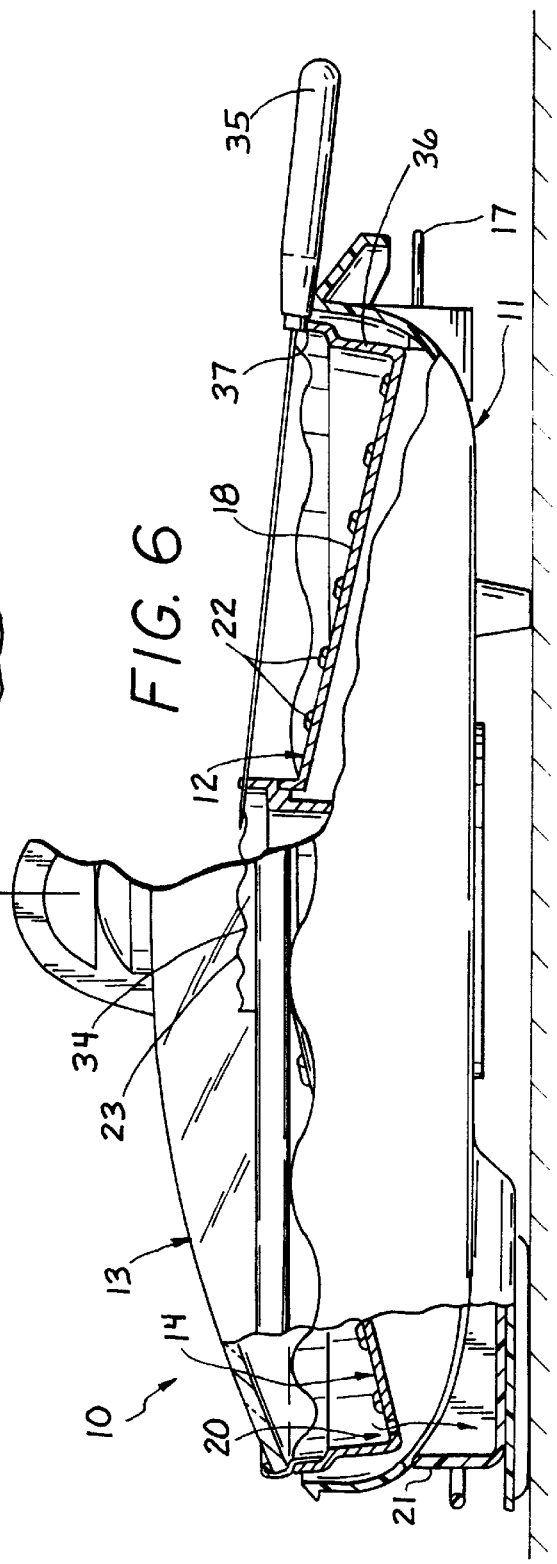

TABLE TOP GRILL

BACKGROUND OF THE INVENTION

1. Technical Field

This invention relates generally to appliances for preparing foodstuffs, and more particularly to an electric table top grill having significantly improved features and functionality.

2. Description of Related Art

A table top grill provides a lightweight, portable cooking appliance that a user can conveniently transport manually for table top or counter top use. It includes a glass lid atop an electric cooking plate that is sometimes called an electric grill plate. The electric grill plate itself includes two basic components: a plate component with a cooking surface (usually non-stick), and an electric heating element component in heat conducting relation to the plate component. The user simply plugs the heating element component into an electric outlet, adjusts the heating element temperature control knob to a selected range, arranges foodstuffs on the non-stick cooking surface of the plate component, and then places the cover onto the plate component over the foodstuffs until all is cooked as desired.

Such cooking appliances enjoy popular approval. But consumers continue to look for new healthy culinary adventures that challenge current table top grill designs. Users want simpler, lighter, home-style cooking, ethnic breads/dishes, regional cooking, and fresh quality produce. They want the table top grill they use to help them create the new, interesting, and fun meals they envision. Thus, users seek improvements in existing table top grills.

SUMMARY OF THE INVENTION

This invention addresses the need outlined above by providing an electric table top grill with various combinations of new features, including a frustum-shaped cooking surface that promotes drainage from foodstuffs during cooking. That feature combines in the illustrated grill with a pattern of concentric ribs for holding the foodstuffs from sliding downwardly across the cooking surface, a two-position marinade cup mounted in a central chimney for containing marinade in a selected one of high-heat and low-heat proximity to the cooking surface of the plate component, a scalloped cup lip for receiving kabob skewers, a perimeter fence along a lower marginal edge of the plate component for retaining the foodstuffs on the cooking surface, and indentations along the fence for receiving the skewers and providing a flow path for steam to pass out from under the cover. These features combine in a lightweight, portable electric table top grill with a see-through glass cover, removable grease tray, cool-to-touch base, and submersible electric grill plate.

To paraphrase some of the more precise language appearing in the claims, an appliance for cooking foodstuffs includes an electric grill plate adapted for use atop a horizontal table top surface. The electric grill plate includes a plate component, and according to a major aspect of the invention, the plate component includes a frustum-shaped cooking surface (e.g., a circular cone-shaped surface with the apex removed). The frustum-shaped cooking surface slopes downwardly in all horizontal directions from a central vertical axis in order to promote drainage from foodstuffs during cooking. According to another aspect of the invention, one embodiment also includes means for holding the foodstuffs from sliding downwardly across the cooking surface, including ribs on the plate component that protrude upwardly from the cooking surface.

According to yet another aspect of the invention, means are provided in the form of a cup for containing marinade in proximity to the cooking surface of the plate component. The plate component defines a central opening and the cup has a size and shape adapted to removably fit within the central opening. The cup is adapted for movement between a first position of the cup and a second position of the cup such that the amount of heat transfer to the cup in the first position is greater than the amount of heat transfer to the cup in the second position.

According to still another aspect of the invention the cup includes a lip having spaced apart indentations (e.g., scallops) for receiving skewers. An upstanding flange (a fence) circumscribing a lower marginal edge portion of the plate component retains the foodstuffs on the cooking surface, and it also includes spaced apart indentations along the upstanding flange for receiving skewers. The indentations also provide a flow path for steam to pass out from under the cover. Air flows upwardly through the central opening in the plate component, then downwardly across the foodstuffs, and out the indentations in the upstanding flange.

The electric grill plate is suitable for submersion in water for cleaning purposes, and a grease outlet opening is provided through the plate component together with a removable grease drawer aligned with the grease outlet opening. The following illustrative drawings and detailed description make the foregoing and other objects, features, and advantages of the invention more apparent.

BRIEF DESCRIPTION OF THE DRAWINGS

FIG. 3 is a perspective view of the marinade cup and the upper portion of the plate component in which the cup opening is located;

FIG. 4 is a further enlarged elevation view of the marinade cup and the upper portion of the plate component, with portions in cross section to show details of the marinade cup in the lowered high-heat position;

FIG. 5 is a view similar to FIG. 4 with the marinade cup in the raised low-heat position; and FIG. 6 is a left side view of the table top grill on a horizontal table top surface, with some portions broken away and other portions in cross section to further illustrate details of construction.

DESCRIPTION OF THE PREFERRED EMBODIMENTS

Figure 1:
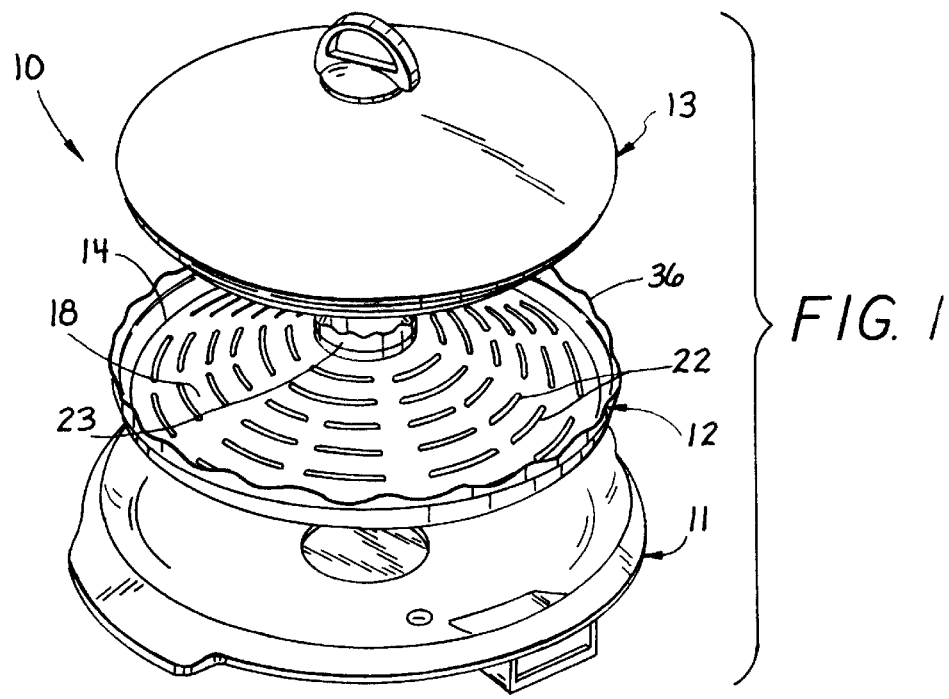
FIG. 1 of the drawings is a front, top, and left side perspective view of a table top grill constructed according to the invention, showing the cover, electric grill plate, and base disassembled.

FIGS. 1–6 of the drawings illustrate various aspects of a table top grill 10 constructed according to the invention. Generally, the table top grill 10 includes a base 11 (FIGS. 1, 2 and 6), an electric grill plate 12 (FIGS. 1, 2, and 6) that is supported by the base 11, and a cover 13 (FIGS. 1 and 6) that sets atop the electric grill plate 12. Those components are adapted to be conveniently disassembled for cleaning purposes and reassembled for use.

The base 11 is composed of a suitably rigid material (e.g., plastic or metallic). It incorporates suitable feet and handle members so that a user can conveniently transport it manually and set it atop a table top or counter top for use. It is adapted to removably receive the electric grill plate 12.

The electric grill plate 12 utilizes known technology in some respects in that it includes a non-stick coated, heavy gauge aluminum plate component 14 (FIGS. 1–6) and a heating element component 15 (FIG. 2) in heat conducting relation to the plate component 14. The heating element component 15 is not illustrated in detail because it is a known type of electric component, and it is designated only generally in FIG. 2 by a leadline to a temperature controller 16 which is part of the heating element component 15 for purposes of this description. The heating element component 15 may include, for example, a 1200 watt round coiled heating element inside the plate component 14, two male connectors (such as the one male connector 17 visible in FIG. 6), and a temperature probe outfitted temperature controller (i.e., the temperature controller 16) that plugs onto the male connectors. Based upon the foregoing and subsequent descriptions, one of ordinary skill can readily fabricate these components to function as described, and the components are all arranged so that the electric grill plate 12 is adapted to removably fit in the base 11.

The cover 13 is preferably a see-through tempered glass component that fits removably atop the plate component 14. It sets atop the plate component 14 during cooking, bearing against the plate component 14 and not the foodstuffs, and it has an overall diameter of about 14.5 inches, which is the overall outside diameter of the illustrated plate component 14. As a further idea of size, the illustrated table top grill is about 7.5 inches in overall height and weighs about 8.5 to 9.0 pounds. That makes it conveniently transported manually and small enough to fit conveniently on a typical table top surface. Of course, those specifications may vary quite a bit within the scope of the claims and without departing from the broader aspects of the invention.

Figure 2:
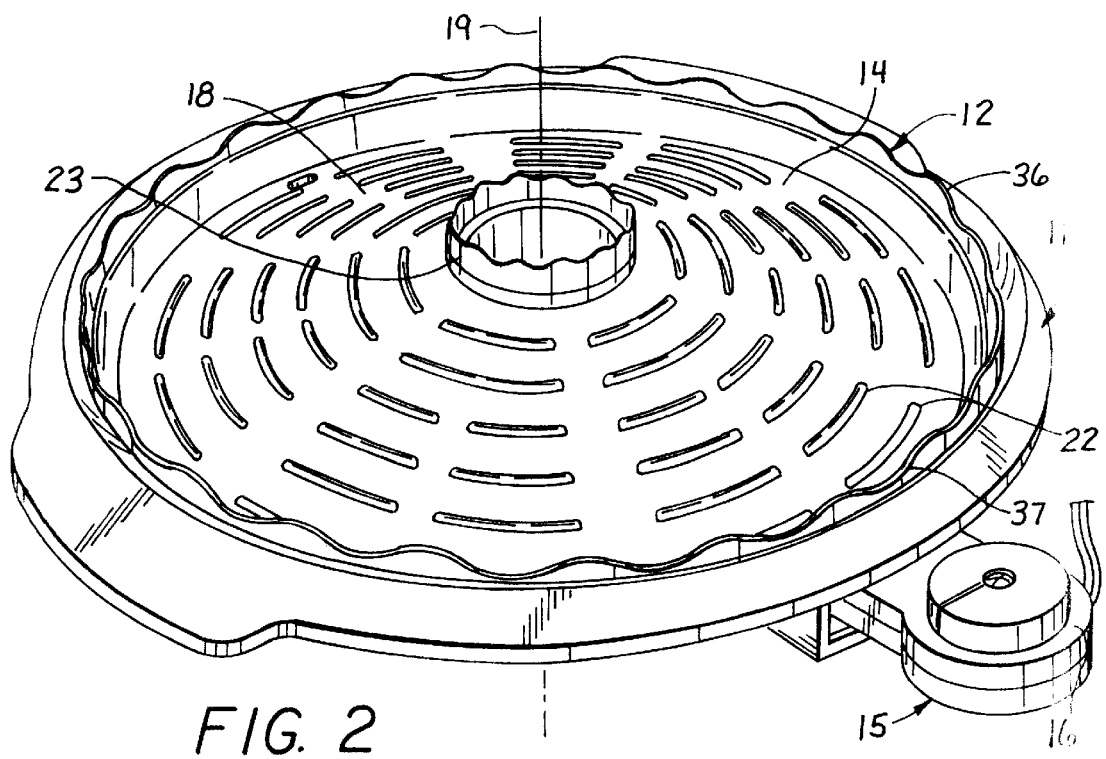
FIG. 2 is an enlarged perspective view with the cover omitted, showing the electric grill plate and base assembled, the temperature controller connected to the rest of the electric grill plate, and the marinade cup in the lower high-heat position.

According to a major aspect of the invention, the plate component 14 includes a frustum-shaped cooking surface 18 (FIGS. 1–6). In other words, the cooking surface 18 is similar to the surface of a frustum in the sense that a frustum is that part of a cone-shaped solid next to the base that is formed by cutting off the top (the vertex) by a plane parallel to the base, and the cooking surface 18 slopes downwardly in all horizontal directions from a central vertical axis 19 (FIGS. 2, 5, and 6). The illustrated cooking surface 18 is symmetrical about the vertical axis 19 and it slopes at about 15.0 degrees with the horizontal (corresponding to 75.0 degrees with the vertical).

The sloping cooking surface 18 promotes downward drainage of grease and other liquids emitted from foodstuffs during cooking. An opening 20 through the plate component 14 (FIG. 6) provides a path for those liquids to flow so that they can drip into a grease collection drawer 21 as depicted by the arrow through the opening 20. The grease collection drawer 21 removably slides into the base 11 in alignment with the opening 20.

A pattern or array of protrusions or ribs 22 extend upwardly from the cooking surface 18. They function as means for holding foodstuffs (not shown) that have been placed upon the cooking surface 18 from sliding downwardly across the cooking surface 18. Only two ribs 22 are designated in FIG. 1 for illustrative convenience in order to keep the drawings less cluttered. Only two ribs 22 (a different two) are designated in FIG. 2 and only two ribs 22 (another different two) are designated in FIG. 6 for the same reason. The illustrated ribs 22 are concentric circular arcs centered on the vertical axis 19.

According to another aspect of the invention, there is provided means in the form of a cup 23 (FIGS. 1–6) for containing up to about six fluid ounces of marinade in proximity to the cooking surface 18 of the plate component 14. The plate component 14 defines a central opening 24 (FIG. 3) centered on the vertical axis 19, and the cup 23 has a size and shape adapted to removably fit within the central opening 24. The cup 23 is cylindrical and composed of a heavy gauge aluminum alloy coated with a non-stick material. It includes a rim 25 (FIGS. 3–5) with a downwardly facing bearing surface 26 (FIGS. 4 and 5), and the plate component 14 includes a collar 27 (FIGS. 3–5) with an upwardly facing bearing surface 28 circumscribing the central opening 24 (FIGS. 3 and 5).

Three evenly spaced protrusions or splines are provided on the cup 23, only two protrusions 29 and 30 being visible in FIGS. 3–5. The three protrusions mate with three evenly spaced grooves 31, 32, and 33 in the collar 27. With the protrusions and grooves aligned, the cup sets upon the collar so that the bearing surface 26 lies flat upon the bearing surface 28 for maximum heat transfer from the plate component 14 to the cup 23. This is referred to as a first or high-heat position of the cup 23, and it is illustrated in FIG. 4. By lifting the cup 23 slightly so that the protrusions clear the channels, the cup 23 can be rotated slightly so that the protrusions and channels are not aligned. In that case, the protrusions set upon the bearing surface 28, leaving space between the bearing surface 26 and the bearing surface 28. This is referred to as a second or low-heat position of the cup 23, and it is illustrated in FIG. 5. Thus, less heat is transferred to the cup 23 in the second position than is transferred to the cup 23 in the first position.

Another aspect of the cup 23 is that the lip 25 includes spaced apart indentations or scallops 34 on 0.75-inch centers around the lip 25 for receiving skewers, such as the skewer 35 illustrated in FIG. 6. One such scallop 34 is designating in each of FIGS. 3–6). A user rests the skewer 35 in a selected one of the scallops 34. The plate component 14 also has scallops. The plate component 14 includes a 1.025-inch high upstanding flange or fence 36 (FIGS. 1, 2, and 6) around a lower marginal edge portion of the plate component 14. The fence 36 serves the function of retaining foodstuffs on the cooking surface 18 and it also includes scallops 37, only one scallop 37 being designated in each of FIGS. 2 and 6. The scallops 37 are indentations that receive skewers like the skewer 35. They also allow air and steam to escape from underneath the cover 12. In other words, they provide a flow path for steam to pass out from under the cover after it passes over the foodstuffs being cooked.

Thus, the invention provides a lightweight, portable, electric table top grill with various combinations of new features, including a frustum-shaped cooking surface that promotes drainage from foodstuffs during cooking. That feature combines in the illustrated grill with ribs, two-position marinade cup, skewer scallops, perimeter fence, an improved flow path for steam, see-through glass cover, removable grease tray, cool-to-touch base, and submersible electric grill plate. Although an exemplary embodiment has been shown and described, one of ordinary skill in the art may make many changes, modifications, and substitutions without necessarily departing from the spirit and scope of the invention.

What is claimed is:

1. An appliance for cooking foodstuffs, comprising:

an electric grill plate adapted for use atop a horizontal table top surface;

a plate component of the electric grill plate;

a frustum-shaped cooking surface on the plate component that slopes downwardly in all horizontal directions from a central vertical axis in order to promote drainage from foodstuffs during cooking;

a cover adapted to rest atop the plate component over the cooking surface;

rib means for holding the foodstuffs from sliding downwardly across the cooking surface, including ribs on the plate component that protrude upwardly from the cooking surface;

fence means for retaining the foodstuffs on the cooking surface, including an upstanding flange circumscribing a lower marginal edge portion of the plate component;

indentation means for holding skewers and for providing a flow path for steam to pass out from under the cover, including spaced apart indentations along the upstanding flange;

cup means for containing marinade in proximity to the cooking surface of the plate component, the plate component defining a central opening, said cup means having a size and shape adapted to removably fit within the central opening, and said cup means including a lip having spaced apart indentations for holding the skewers; and the combination of a grease outlet opening through the plate component and a removable grease drawer aligned with the grease outlet opening.

* * * * *